United States Patent
Koch et al.

(10) Patent No.: US 10,346,931 B2
(45) Date of Patent: Jul. 9, 2019

(54) ARRANGEMENT FOR COMMUNICATING DEMAND RESPONSE RESOURCE INCENTIVES

(71) Applicant: Honeywell International Inc., Morristown, NJ (US)

(72) Inventors: Edward Koch, San Rafael, CA (US); Stephen Pierson, Fairfax, CA (US)

(73) Assignee: Honeywell International Inc., Morris Plains, NJ (US)

(*) Notice: Subject to any disclaimer, the term of this patent is extended or adjusted under 35 U.S.C. 154(b) by 570 days.

(21) Appl. No.: 13/940,066

(22) Filed: Jul. 11, 2013

(65) Prior Publication Data
US 2015/0019032 A1    Jan. 15, 2015

(51) Int. Cl.
*G06Q 50/06* (2012.01)
*G05B 15/02* (2006.01)

(52) U.S. Cl.
CPC ............. *G06Q 50/06* (2013.01); *G05B 15/02* (2013.01); *Y04S 20/224* (2013.01); *Y04S 50/14* (2013.01)

(58) Field of Classification Search
None
See application file for complete search history.

(56) References Cited

U.S. PATENT DOCUMENTS

| | | | |
|---|---|---|---|
| 4,110,827 A | 8/1978 | Shavit | |
| 4,130,874 A | 12/1978 | Pai | |
| 4,153,936 A | 5/1979 | Scmitz et al. | |
| 4,419,667 A | 12/1983 | Gurr et al. | |
| 4,850,010 A | 7/1989 | Stanbury et al. | |

(Continued)

FOREIGN PATENT DOCUMENTS

| EP | 2456227 | 5/2012 |
|---|---|---|
| JP | 2012118982 | 6/2012 |

(Continued)

OTHER PUBLICATIONS

Combined Search and Examination Report Under Sections 17 and 18(3) for Corresponding UK Patent Application Serial No. GB1504192.4 dated Sep. 8, 2015.

(Continued)

*Primary Examiner* — Sean Shechtman
(74) *Attorney, Agent, or Firm* — Seager, Tufte & Wickhem LLP

(57) ABSTRACT

An approach for influencing demand response event performance through a variable incentive signal. Automated demand response programs may achieve an energy demand reduction by signaling participating consumers to curtail energy usage for a certain period of time, referred to as an "event". Customers may be free to "opt-out" and withdraw their participation from DR events, on a per-event basis. When a participant opts out, the quantity of energy savings of the event may be reduced. Participating customers may be sent a message offering an incentive to tolerate an ongoing DR event. As the event progresses, the DR operator may dynamically monitor and modulate the rate of opt-outs. The present approach may be different in that instead of modulating the number of participants that are included in the event, it may modulate an incentive signal to keep already-included participants from opting out.

19 Claims, 8 Drawing Sheets

(56) References Cited

U.S. PATENT DOCUMENTS

| | | |
|---|---|---|
| 4,937,760 A | 6/1990 | Beitel et al. |
| 5,341,142 A | 8/1994 | Reis et al. |
| 5,500,561 A | 3/1996 | Wilhelm |
| 5,566,084 A | 10/1996 | Cmar |
| 5,572,438 A | 11/1996 | Ehlers et al. |
| 5,598,349 A | 1/1997 | Elliason et al. |
| 5,719,854 A | 2/1998 | Choudhury et al. |
| 5,822,553 A | 10/1998 | Gifford et al. |
| 5,892,758 A | 4/1999 | Argyroudis |
| 6,026,375 A | 2/2000 | Hall et al. |
| 6,195,367 B1 | 2/2001 | Jakobik et al. |
| 6,209,018 B1 | 3/2001 | Ben-shachar et al. |
| 6,252,950 B1 | 6/2001 | Duty et al. |
| 6,259,723 B1 | 7/2001 | Miyashita |
| 6,278,717 B1 | 8/2001 | Arsenault et al. |
| 6,289,384 B1 | 9/2001 | Whipple et al. |
| 6,366,926 B1 | 4/2002 | Pohlmann et al. |
| 6,446,136 B1 | 9/2002 | Pohlmann et al. |
| 6,519,509 B1 | 2/2003 | Nierlich et al. |
| 6,529,723 B1 | 3/2003 | Bentley |
| 6,535,817 B1 | 3/2003 | Krishnamurti et al. |
| 6,566,926 B1 | 5/2003 | Patterson |
| 6,574,581 B1 | 6/2003 | Bohrer et al. |
| 6,758,161 B2 | 7/2004 | Nohynek |
| 6,832,249 B2 | 12/2004 | Ciscon et al. |
| 6,857,022 B1 | 2/2005 | Scanlan |
| 6,865,685 B2 | 3/2005 | Hammond et al. |
| 6,985,087 B2 | 1/2006 | Soliman |
| 7,010,700 B1 | 3/2006 | Foss et al. |
| 7,016,784 B2 | 3/2006 | Allen et al. |
| 7,039,532 B2 | 5/2006 | Hunter |
| 7,069,309 B1 | 6/2006 | Dodrill et al. |
| 7,183,910 B2 | 2/2007 | Alvarez et al. |
| 7,260,616 B1 | 8/2007 | Cook |
| 7,333,880 B2 | 2/2008 | Brewster et al. |
| 7,337,237 B2 | 2/2008 | Salahshoor et al. |
| 7,346,467 B2 | 3/2008 | Bohrer et al. |
| 7,392,115 B2 | 6/2008 | Schindler |
| 7,401,086 B2 | 7/2008 | Chorafakis et al. |
| 7,472,301 B2 | 12/2008 | Ginggen et al. |
| 7,528,503 B2 | 5/2009 | Rognli et al. |
| 7,565,227 B2 | 7/2009 | Richard et al. |
| 7,590,746 B2 | 9/2009 | Slater et al. |
| 7,650,289 B2 | 1/2010 | Cooper et al. |
| 7,676,657 B2 | 3/2010 | Lindholm et al. |
| 7,702,424 B2 | 4/2010 | Cannon et al. |
| 7,715,951 B2 | 5/2010 | Forbes, Jr. et al. |
| 7,742,953 B2 | 6/2010 | King et al. |
| 7,775,191 B2 | 8/2010 | Hou |
| 7,778,738 B2 | 8/2010 | Taft |
| 7,797,009 B2 | 9/2010 | Kiiskila et al. |
| 7,806,845 B2 | 10/2010 | Arm et al. |
| 7,844,481 B2 | 11/2010 | Hilbush et al. |
| 7,845,576 B2 | 12/2010 | Siddaramanna et al. |
| 7,865,252 B2 | 1/2011 | Clayton |
| 7,873,441 B2 | 1/2011 | Synesiou et al. |
| 7,885,718 B2 | 2/2011 | Yano et al. |
| 7,886,166 B2 | 2/2011 | Shnekendorf et al. |
| 7,925,384 B2 | 4/2011 | Huizenga |
| 7,941,528 B2 | 5/2011 | Hicks, III et al. |
| 7,954,726 B2 | 6/2011 | Siddaramanna et al. |
| 7,958,229 B2 | 6/2011 | Conway |
| 8,000,913 B2 | 8/2011 | Kreiss et al. |
| 8,023,410 B2 | 9/2011 | O'Neill |
| 8,073,558 B2 | 12/2011 | Koch et al. |
| 8,091,794 B2 | 1/2012 | Siddaramanna et al. |
| 8,140,279 B2 | 3/2012 | Subbloie |
| 8,140,658 B1 | 3/2012 | Gelvin et al. |
| 8,143,811 B2 | 3/2012 | Shloush et al. |
| 8,163,276 B2 | 4/2012 | Hedrick et al. |
| 8,170,774 B2 | 5/2012 | Forte et al. |
| 8,183,995 B2 | 5/2012 | Wang et al. |
| 8,199,773 B2 | 6/2012 | Aubin et al. |
| 8,232,745 B2 | 7/2012 | Chemel et al. |
| 8,234,017 B2 | 7/2012 | Ahn |
| 8,234,876 B2 | 8/2012 | Parsonnet et al. |
| 8,260,468 B2 | 9/2012 | Ippolito et al. |
| 8,260,469 B2 | 9/2012 | Gregory et al. |
| 8,260,650 B2 | 9/2012 | Miller |
| 8,280,656 B2 | 10/2012 | Kreiss et al. |
| 8,291,243 B2 | 10/2012 | Castelli et al. |
| 8,295,989 B2 | 10/2012 | Rettger et al. |
| 8,305,380 B2 | 11/2012 | Gotwalt et al. |
| 8,312,299 B2 | 11/2012 | Tremel et al. |
| 8,321,302 B2 | 11/2012 | Bauer et al. |
| 8,321,950 B2 | 11/2012 | Oran |
| 8,327,024 B2 | 12/2012 | Pattison et al. |
| 8,330,762 B2 | 12/2012 | Grossman |
| 8,352,094 B2 | 1/2013 | Johnson et al. |
| 8,373,547 B2 | 2/2013 | Benya et al. |
| 8,386,086 B2 | 2/2013 | Roux et al. |
| 8,406,937 B2 | 3/2013 | Verfuerth et al. |
| 8,412,654 B2 | 4/2013 | Montalvo |
| 8,417,391 B1 | 4/2013 | Rombouts et al. |
| 8,443,355 B2 | 5/2013 | Wiese et al. |
| 8,565,903 B2 | 10/2013 | Koch et al. |
| 8,595,094 B1 | 11/2013 | Forbes, Jr. |
| 8,606,418 B1 | 12/2013 | Myers et al. |
| 8,621,097 B2 | 12/2013 | Venkatakrishnan et al. |
| 8,626,354 B2 | 1/2014 | Walter et al. |
| 8,630,744 B2 | 1/2014 | Walter et al. |
| 8,639,214 B1 | 1/2014 | Fujisaki |
| 8,676,273 B1 | 3/2014 | Fujisaki |
| 8,676,953 B2 | 3/2014 | Koch |
| 8,700,187 B2 | 4/2014 | Forbes, Jr. |
| 8,782,190 B2 | 7/2014 | Koch |
| 8,868,925 B2 | 10/2014 | Wyatt et al. |
| 8,879,488 B2 | 11/2014 | Pavlovski et al. |
| 8,880,226 B2 | 11/2014 | Raman et al. |
| 9,088,179 B2 | 7/2015 | Shaffer et al. |
| 9,124,535 B2 | 9/2015 | Koch |
| 9,137,050 B2 | 9/2015 | Koch |
| 9,153,001 B2 | 10/2015 | Walter et al. |
| 9,183,522 B2 | 11/2015 | Koch |
| 9,530,169 B2 | 12/2016 | Strelec et al. |
| 9,680,308 B2 | 6/2017 | Bruschi et al. |
| 9,805,325 B2 | 10/2017 | Ippolito et al. |
| 2003/0016237 A1 | 1/2003 | Hickey |
| 2003/0033230 A1 | 2/2003 | Mccall |
| 2003/0069752 A1 | 4/2003 | LeDain et al. |
| 2003/0233064 A1 | 12/2003 | Arm et al. |
| 2003/0233201 A1 | 12/2003 | Horst et al. |
| 2004/0034484 A1 | 2/2004 | Solomita, Jr. et al. |
| 2004/0095237 A1* | 5/2004 | Chen .............. G06F 11/0748 340/506 |
| 2004/0137897 A1 | 7/2004 | Teixeira |
| 2004/0203649 A1 | 10/2004 | Cashiola |
| 2005/0027636 A1 | 2/2005 | Gilbert et al. |
| 2005/0152694 A1 | 7/2005 | Chown |
| 2005/0172304 A1 | 8/2005 | Tavares et al. |
| 2005/0194456 A1 | 9/2005 | Tessier et al. |
| 2005/0229220 A1 | 10/2005 | Fisher et al. |
| 2005/0262026 A1 | 11/2005 | Watkins |
| 2007/0005195 A1 | 1/2007 | Pasquale et al. |
| 2007/0055999 A1 | 3/2007 | Radom et al. |
| 2007/0124109 A1 | 5/2007 | Timko et al. |
| 2007/0222295 A1 | 9/2007 | Wareham et al. |
| 2008/0011864 A1 | 1/2008 | Tessier et al. |
| 2008/0046715 A1 | 2/2008 | Balazs et al. |
| 2008/0114638 A1 | 5/2008 | Colliau et al. |
| 2008/0167931 A1 | 7/2008 | Gerstemeier et al. |
| 2008/0177678 A1 | 7/2008 | Di Martini et al. |
| 2008/0195255 A1 | 8/2008 | Lutze et al. |
| 2008/0262848 A1 | 10/2008 | Shienbrood et al. |
| 2009/0027932 A1 | 1/2009 | Haines et al. |
| 2009/0046625 A1 | 2/2009 | Diener et al. |
| 2009/0187499 A1 | 7/2009 | Mulder et al. |
| 2009/0198384 A1 | 8/2009 | Ahn |
| 2009/0204977 A1 | 8/2009 | Tavares et al. |
| 2009/0249090 A1 | 10/2009 | Schmitz et al. |
| 2009/0271255 A1 | 10/2009 | Utter et al. |
| 2009/0281674 A1 | 11/2009 | Taft |
| 2009/0295594 A1 | 12/2009 | Yoon |
| 2009/0297488 A1 | 12/2009 | Fraser et al. |

(56) References Cited

U.S. PATENT DOCUMENTS

| | | |
|---|---|---|
| 2009/0313083 A1 | 12/2009 | Dillon et al. |
| 2009/0319090 A1 | 12/2009 | Dillon et al. |
| 2009/0319310 A1 | 12/2009 | Little |
| 2010/0057480 A1 | 3/2010 | Arfin et al. |
| 2010/0076615 A1 | 3/2010 | Daniel et al. |
| 2010/0076835 A1 | 3/2010 | Silverman |
| 2010/0106342 A1 | 4/2010 | Ko et al. |
| 2010/0106543 A1 | 4/2010 | Marti |
| 2010/0114340 A1 | 5/2010 | Huizenga et al. |
| 2010/0138363 A1 | 6/2010 | Batterberry et al. |
| 2010/0168924 A1 | 7/2010 | Tessier et al. |
| 2010/0179704 A1 | 7/2010 | Ozog |
| 2010/0241285 A1 | 9/2010 | Johnson et al. |
| 2010/0274377 A1 | 10/2010 | Kaufman et al. |
| 2010/0283606 A1 | 11/2010 | Tsypin et al. |
| 2010/0324962 A1 | 12/2010 | Nesler et al. |
| 2011/0016200 A1 | 1/2011 | Koch |
| 2011/0040550 A1 | 2/2011 | Graber et al. |
| 2011/0040666 A1 | 2/2011 | Crabtree et al. |
| 2011/0046805 A1 | 2/2011 | Bedros et al. |
| 2011/0066300 A1* | 3/2011 | Tyagi ............... H02J 3/14 700/291 |
| 2011/0093493 A1 | 4/2011 | Nair et al. |
| 2011/0113068 A1 | 5/2011 | Ouyang |
| 2011/0125542 A1 | 5/2011 | Koch |
| 2011/0172836 A1 | 7/2011 | Boss et al. |
| 2011/0172838 A1 | 7/2011 | Pai et al. |
| 2011/0196539 A1 | 8/2011 | Nair et al. |
| 2011/0196546 A1 | 8/2011 | Muller et al. |
| 2011/0199209 A1 | 8/2011 | Siddaramanna et al. |
| 2011/0212700 A1 | 9/2011 | Petite |
| 2011/0231320 A1 | 9/2011 | Irving |
| 2011/0258049 A1 | 10/2011 | Ramer et al. |
| 2011/0264291 A1* | 10/2011 | Le Roux ............... G06Q 10/06 700/291 |
| 2011/0270454 A1 | 11/2011 | Kreiss et al. |
| 2011/0301774 A1 | 12/2011 | Koch |
| 2012/0066397 A1 | 3/2012 | Koch et al. |
| 2012/0066686 A1 | 3/2012 | Koch |
| 2012/0078687 A1* | 3/2012 | Ghosh ............... G06Q 50/06 705/14.1 |
| 2012/0084696 A1 | 4/2012 | Marti |
| 2012/0093141 A1 | 4/2012 | Imes et al. |
| 2012/0101653 A1 | 4/2012 | Tran |
| 2012/0109399 A1 | 5/2012 | Tran |
| 2012/0136915 A1 | 5/2012 | Koch et al. |
| 2012/0173030 A1 | 7/2012 | Taft |
| 2012/0197456 A1 | 8/2012 | Walter et al. |
| 2012/0197457 A1 | 8/2012 | Walter et al. |
| 2012/0197458 A1 | 8/2012 | Walter et al. |
| 2012/0245968 A1 | 9/2012 | Beaulieu et al. |
| 2012/0271473 A1 | 10/2012 | Koch |
| 2012/0277920 A1 | 11/2012 | Koch |
| 2013/0035992 A1 | 2/2013 | Silverman |
| 2013/0047010 A1 | 2/2013 | Massey et al. |
| 2013/0079931 A1 | 3/2013 | Wanchoo et al. |
| 2013/0123996 A1 | 5/2013 | Matos |
| 2013/0144451 A1* | 6/2013 | Kumar ............... G05B 13/02 700/291 |
| 2013/0173243 A1 | 7/2013 | Kayton et al. |
| 2013/0254151 A1 | 9/2013 | Mohagheghi et al. |
| 2014/0081704 A1 | 3/2014 | Strelec et al. |
| 2014/0122181 A1 | 5/2014 | Fisera et al. |
| 2014/0149973 A1 | 5/2014 | Walter et al. |
| 2014/0277769 A1 | 9/2014 | Matsuoka et al. |
| 2014/0277795 A1* | 9/2014 | Matsuoka ............... G06Q 50/06 700/291 |
| 2014/0278687 A1 | 9/2014 | McConky et al. |
| 2015/0018985 A1 | 1/2015 | Koch et al. |
| 2015/0019037 A1 | 1/2015 | Koch |
| 2015/0019275 A1 | 1/2015 | Koch |
| 2015/0134280 A1 | 5/2015 | Narayan et al. |
| 2015/0170171 A1 | 6/2015 | McCurnin et al. |

FOREIGN PATENT DOCUMENTS

| | | |
|---|---|---|
| WO | WO 2005/033964 | 4/2005 |
| WO | WO 2008/027455 | 3/2008 |
| WO | WO 2008/027457 | 3/2008 |
| WO | WO 2009/006133 | 1/2009 |
| WO | WO 2009/020606 | 2/2009 |
| WO | WO 2009/023230 | 2/2009 |
| WO | WO 2009/027617 | 3/2009 |
| WO | WO 2009/085610 | 7/2009 |
| WO | 2011008775 | 1/2011 |
| WO | WO 2011/065007 | 6/2011 |
| WO | WO 2013/025565 | 2/2013 |
| WO | WO 2013/055551 | 4/2013 |
| WO | 2014036408 | 3/2014 |

OTHER PUBLICATIONS

Autogrid, "Austin Energy and AutoGrid Systems Collaborate on Standards-Based Automated Demand Response to Usher in a New Era of Retail Choice for the Demand Response Market," 5 pages, Feb. 26, 2013.

U.S. Appl. No. 13/939,935, filed Jul. 11, 2013.

U.S. Appl. No. 13/940,043, filed Jul. 11, 2013.

U.S. Appl. No. 13/940,090, filed Jul. 11, 2013.

U.S. Appl. No. 14/056,902, filed Oct. 17, 2013.

Santacana et al., "Getting Smart, With a Clearer Vision of Intelligent Grid, Control Emerges from Chaos," IEEE Power and Energy Magazine, pp. 41-48, Mar./Apr. 2010.

"Smart Demand Response: A Discussion Paper," Energy Networks Association, energyuk, 44 pages, prior to Nov. 29, 2012.

Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.

European Search Report for Related Application No. EP 12169650.4, dated Nov. 22, 2012.

International Search Report for PCT ApplicationSerial No. pct/us2012/05837, International Filing Date Oct. 3, 2012.

Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.

Cruz, "Tutorial on GPU Computing with an Introduction to CUDA," 37 pages, prior to Nov. 17, 2011.

Holmberg, "Facility Interface to the Smart Grid," National Institute of Standards and Technology, 7 pages, printed 2012.

Honeywell, "Automated Demand Response—Southern California Program," 2 pages, printed Aug. 1, 2011.

Honeywell, "The Perfect Response to Peak Events," 4 pages, Nov. 2010.

http://en.wikipedia.org/wiki/Demand_response, "Demand Response," 10 pages, printed Feb. 3, 2012.

http://www.naesb.org/pdf3/dsmee012308213.doc, "Demand Response Measurement and Verification Literature Review," 29 pages, created Jan. 14, 2008, modified Dec. 18, 2012.

https://buildingsolutions.honeywell.com/Cultures/en-US/Markets/Utilities/DemandResponse/, 1page, printed Feb. 3, 2012.

Hunt, "Automated Demand Response System and Advanced End-Use Services Platform," Optimal Technologies, 31, pages, Sep. 24, 2004.

Kiliccote et al., "Findings from Seven Years of Field Performance Data for Automated Demand Response in Commercial Buildings," Lawrence Berkeley National Laboratory, Report No. LBNL-3643E, May 2010.

Kiliccote et al., "Open Automated Demand Response Communications in Demand Response for Wholesale Ancillary Services," Lawrence Berkeley National Laboratory, Report No. LBNL-2945E, 13 pages, Nov. 2009.

Kiliccote et al., "Open Automated Demand Response for Small Commercial Buildings," Lawrence Berkeley National Laboratory, Report No. LBNL-2195E, 104 pages, Jul. 2009.

(56) References Cited

OTHER PUBLICATIONS

Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkeley National Laboratory, Report No. LBNL-2905E, 11 pages, Nov. 2009.
Koch et al., "Scenarios for Consuming Standardized Automated Demand Response Signals," Lawrence Berkeley National Laboratory, Report No. LBNL-1362E, 10 pages, Nov. 2008.
Koch, "The Demand Response Automation Server (DRAS)," Building Performance, http://www.akuacom.com/assets/pdf/ASHRAE_2008_Ed_Koch.pdf, 18 pages, prior to Nov. 17, 2011.
Olson, "New Approaches in Automating and Optimizing Demand Response to Solve Peak Load Management Problems," Building IQ brochure, 8 pages, 2011.
Piette et al., "Automated Critical Peak Pricing Field Tests: 2006 Pilot Program Description and Results," Berkeley National Laboratory, Report No. LBNL-62218, 67 pages, Aug. 2007.
Piette et al., "Automated Critical Peak Pricing Field Tests: Program Description and Results," Lawrence Berkeley National Laboratory, Report No. LBNL-59351, Apr. 2006.
Piette et al., "Design and Implementation of an Open, Interoperable Automated Demand Response Infrastructure," Berkeley National Laboratory, Report No. LBNL-63665, 6 pages, Oct. 2007.
Piette et al., "Findings From the 2004 Fully Automated Demand Response Tests in Large Facilities," Lawrence Berkeley National Laboratory, Report No. LBNL-58178, 197 pages, Sep. 2005.
Piette et al., "Linking Continuous Energy Management and Open Automated Demand Response," Lawrence Berkeley National Laboratory, Report No. LBNL-1361E, 9 pages, Nov. 2008.
Piette et al., "Open Automated Demand Response Communications Specification," Version 1.0, CEC-500-2009-063, 214 pages, Apr. 2009.
Piette et al., "Participation through Automation: Fully Automated Critical Peak Pricing in Commercial Buildings," Berkeley National Laboratory, Report No. LBNL-60614, 14 pages, Aug. 13-18, 2006.
Schisler et al., "The Role of Demand Response in Ancillary Services Markets," IEEE, 3 pages, 2008.
Violette et al., "DRR Valuation and Market Analysis Volume II: Assessing the DRR Benefits and Costs," Summit Blue Consulting, 112 pages, Jan. 6, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
Zaidi et al., "Load Recognition for Automated Demand Response in Microgrids," IEEE, pp. 2436-2439, 2010.
"Executive Summary," 1 page, prior to Sep. 2007.
U.S. Appl. No. 14/526,193, filed Oct. 28, 2014.
U.S. Appl. No. 14/224,744, filed Mar. 25, 2014.
Federal Energy Regulatory Commission (FERC), "Assessment of Demand Response & Advanced Metering," 92 pages, Sep. 2007.
http://www.akuacom.com/solutions/index.html, "Akuacom—Automated Demand Response," 2 pages, printed Feb. 3, 2012.
Couper, "Optimizing Demand Response to Improve Economic Dispatch and Reliability," downloaded from http://public.dhe.ibm.com/common/ssi/ecm/en/euw03026usen/EUW03026USEN.PDF, 5 pages, prior to Dec. 11, 2013.
U.S. Appl. No. 14/931,746, filed Nov. 3, 2015.
Akuacom by Honeywell, "Automated Demand Response," 2 pages, Sep. 2012.
https://drrc.lbl.gov/openadr, "OpenADR," Berkeley Labs Demand Response Research Center, 2 pages, printed Apr. 6, 2017.
Siemens, "Demand Response Management System (DRMS), Version 2.5," 3 pages, Oct. 2014.

\* cited by examiner

| FACTOR | VALUE | ATTRIBUTE |
|---|---|---|
| F1 | A | FORECAST OF LOAD PROFILE UNDER NORMAL CONDITIONS |
| F2 | B | FORECAST OF LOAD PROFILE CAPABILITIES DURING DR EVENTS |
| F3 | C | REAL TIME LOAD PROFILE |
| F4 | D | AVAILABILITY SCHEDULE |
| F5 | E | UTILITY FIXED COSTS FOR USE OF DR RESOURCES |
| F6 | F | UTILITY PERFORMANCE BASED COSTS |
| F7 | G | RESOURCE OWNER DIRECT COST |
| F8 | H | RESOURCE OWNER INDIRECT COST |
| F9 | I | MILEAGE REMAINING ON DR RESOURCE |
| SCORE | | |

FIGURE 2

ARRANGEMENT FOR COMMUNICATING DEMAND RESPONSE RESOURCE INCENTIVES

BACKGROUND

The present disclosure pertains to utility resources and particularly to assessment and distribution of the resources. More particularly, the disclosure pertains to beneficial management of resources and their loads.

SUMMARY

The disclosure reveals an approach for influencing demand response event performance through a variable incentive signal. Automated demand response programs may achieve an energy demand reduction by signaling participating consumers to curtail energy usage for a certain period of time, referred to as an "event". Customers may be free to "opt-out" and withdraw their participation from DR events, on a per-event basis. When a participant opts out, the quantity of energy savings of the event may be reduced. Participating customers may be sent a message offering an incentive to tolerate an ongoing DR event. As the event progresses, the DR operator may dynamically monitor and modulate the rate of opt-outs. The present approach may be different in that instead of modulating the number of participants that are included in the event, it may modulate an incentive signal to keep already-included participants from opting out.

BRIEF DESCRIPTION OF THE DRAWING

FIG. 2 is a diagram of a table showing a basis of the scoring function for selecting demand response resources;

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Figure 1:
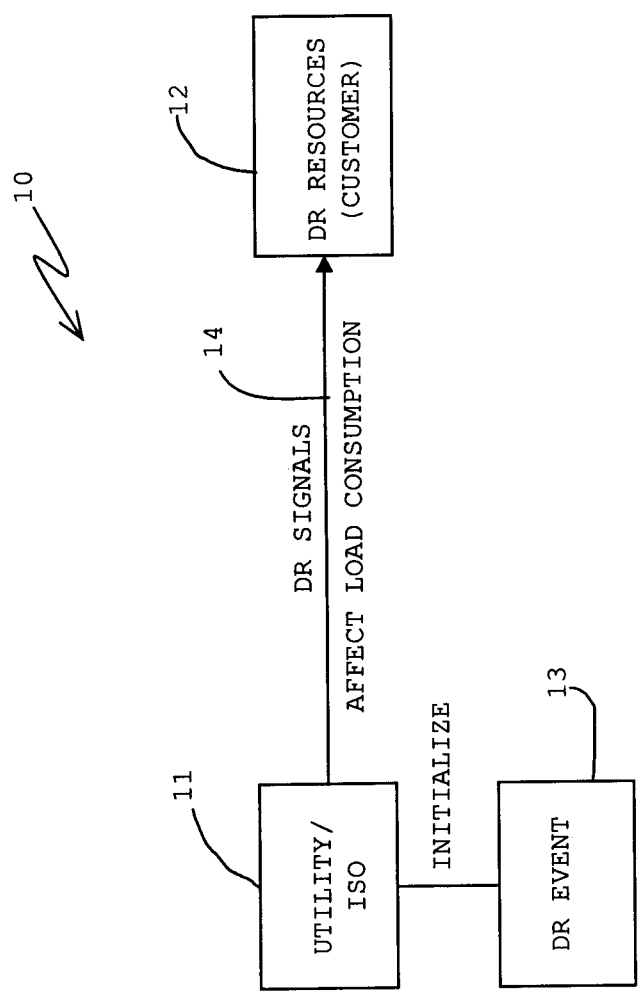
FIG. 1 is a diagram of a layout having a utility/independent system operator (ISO) and demand response resources.

Automated demand response (ADR) programs may be used in a number of different customer market segments ranging from large commercial and industrial to small commercial and residential. A diagram of FIG. 1 shows a layout 10 of a utility/ISO 11 and DR resources 12. Utility/ISO 11 may enroll customers into demand response (DR) programs and model them as so called DR resources 12 that they can call upon when it is necessary for utility 11 to initiate a DR event 13. Calling upon a DR resource 12 typically means that the utility/ISO 11 "dispatches" the DR resources by sending them DR signals 14 which affect their load consumption in some predictable fashion. A pre-cursor to initiating a DR event 14 is the establishment of a set of objectives that need to be accomplished during the DR event. Such objectives may include the following items: 1) A specific amount of load response over some period of time (load responses may entail both reduced and increased levels of consumption); 2) Loads associated with a specific grid and/or geographic locations; 3) A specific type of loads; and 4) Loads with minimum response times and latencies.

When a utility 11 initiates a DR event 13, the utility may typically select some subset of the available DR resources 12 from the collection of all possible DR resources that meets the objectives as outlined above. Each DR resource 12 may have both capabilities and associated costs with using that resource during an event so the problem to be solved is how best to minimize the overall cost of a collection of DR resources while still using their capabilities to satisfy the overall objectives of the DR event 13. Furthermore, in the case of so called "Fast DR", which may require dispatches to happen in real time, it may be necessary that the DR resource 12 selection process be automated and not require human operator involvement.

The present system may solve the requirement for optimizing and automating the process of DR resource 12 selection for DR events 13 by utilizing a scoring function that can be easily applied against each individual resource to create a ranking of each resource. The scoring function may take into account both the capabilities and the costs associated with using the resource. In other words, the DR resource may have a set of attributes that are used as factors in the scoring function. In some cases, the DR resource attributes may be invariant to specific DR events (e.g., geographic location), but in other cases the attribute may have different relevance or values depending upon the specific DR event. For example, if it is a requirement that the DR event happens between 2 pm and 4 pm, but a specific DR resource is not available during those hours, then it should receive a score that ranks it in such a manner that it is not chosen.

Furthermore, the scoring function may have a form that supports operations by the utility operator. Such operations may incorporate: 1) An ability to select which resource attributes may be relevant in the selection process; 2) An ability to select how the resource attributes may be applied in the scoring function; and 3) An ability to increase or decrease the relevance of a resource attribute in the overall score of a DR resource.

The form of the scoring function described below may support virtually all these features. FIG. 2 is a diagram of a table 16 showing a basis of the scoring function.

The selection process may then be easily automated by simply selecting enough of the highest ranked resources that satisfy the load objectives of the DR events 13.

One step may be to model the DR resources 12 by characterizing them with a set of attributes that specify their load consumption capabilities and their costs. A DR resource's capabilities may be characterized with the following attributes (among others).

1) Forecasted load profiles under normal conditions. These may be the predicted levels of load consumption under normal conditions (i.e., not during DR events) as a function of time. Such forecasts may sometimes be referred to as baselines. It may also be dependent upon not only time but may incorporate other factors such as weather or building operational state in view of occupancy.

2) Forecasted load profile capabilities during DR events 13. The profile capabilities may be the predicted levels of load consumption during DR events as a function of time. It could be as simple as a single value or as complex as a multi-dimensional load profile. A load profile's dimensions might include things such as time and dispatch levels.

3) Real time load profiles. The load profiles may be determined in real time based upon real-time feedback from a resource. The profiles may include such things at the current load consumption (i.e., metering) and the current state of the load controller.

The current state of the load controller may provide additional insights into what may be possible if a DR signal 14 is sent to resource 12. For example, if resource 12 is a light and the light is already off then the utility will not be able to get that resource to reduce its consumption by sending it a signal 14.

4) Availability schedules may give the dates and times that the resources are available. A DR resource 12 may also have a cost associated with using that resource. Within the context of this approach, the term cost may be used in a general sense and represent many different dimensions including the following items (among others).

5) Utility fixed financial cost associated with using the resource may be the amount of fixed money that must be spent by the utility 11 for a resource 12 to participate in an event 13.

6) Utility performance based financial costs may be the costs associated with how much money utility 11 must spend to use resource 12 based upon its performance during an event 13. The costs may be based upon such factors as time of day and amount of load response with respect to some baseline. The costs may also be based upon some bid that was submitted by the resource owner.

7) Resource owner financial cost may be another item.

8) Resource owner inconvenience cost may be a qualitative cost that reflects the impact on the resource owner during event 13. The cost may reflect things such as discomfort or necessary changes in the resources owner's operations.

9) Mileage left on resource 12. Often the amount of time or frequency that a resource can be called upon may be constrained either by the user or by the utility program. For example, a resource may be limited to twelve DR events 13 in the course of a year. Thus, a resource that has been called for eight events may have less remaining mileage than one that has only been called for four events.

Other attributes may be used in addition to or in lieu of the one or more above-noted ones. Each of the above attributes may be used as a factor having a value in a scoring function to determine an overall score of a resource within a context of specific DR events and their objectives.

The scoring function may take the following form as at least partially illustrated in table 16. F1, F2, . . . , Fn may be represent the scoring factors. Each Fn, i.e., scoring factor, may correspond to a different attribute of the DR resource and have a value from zero (0) to one (1) that represents how well that a selected individual attribute satisfies the overall objectives of a DR event 13. In general, a value of "one" means that a resource 12 has the highest possible relevance or value with respect to an attribute, and likewise a value of zero means that a resource 12 has the lowest possible value or relevance with respect to the attribute. For example, if F1 represents financial cost then a value of zero would mean that DR resource 12 may have the highest possible financial cost (e.g., the most expensive of all resources) and a value of one would mean that it is the cheapest of all resources.

Table 16 of FIG. 2 shows factors, values and attributes for determining a score for a DR resource. The attributes may be selected from the nine listed above. Factors F1 through F9 may be associated with attributes, respectively. Values, which range from 0 to 1, may be represented by the letters A, B, C, D, E, F, G, H and I, respectively. A score for the DR resource 12 may be determining by adding up the values for each of the listed attributes. Other attributes may be added. Some attributes may be deleted. The scoring function may be customized with respect to needs of the demand response situation at hand. The score may be normalized for comparison with the individual values of the attributes.

The different factors can be applied in the sco (standard choice offer or stranded cost obligation) approach.

In the case of a so-called "Fast DR", the utility may dispatch the DR resources 12 in real time without any prior notification of a DR event 13. Fast DR dispatches may involve sending specific load level commands (e.g., 15 MW) to generators that have no problem responding to such commands in a fairly predictable fashion. Demand response resources 12 unfortunately do not necessarily have the same level of control or predictability in their load responses. It can be difficult to know precisely what a load response from the DR resource will be at any instance because the load response may be dependent upon the following items: 1) The DR signal 14 that is being sent; 2) The current state of the loads being controlled by the DR resource 12; 3) The DR strategies being implemented by the DR resource 12; and 4) Extraneous factors such as weather.

The utility/ISO 11 may perform some sort of regression analysis on past performance of the DR resource 12 to predict what may happen in the future (e.g., baselines). This approach may have major flaws in that there is often a lack of history to properly predict what the behavior will be and the predictions furthermore do not take into consideration the current state of the DR resource 12. In short, the predictions are not necessarily very accurate.

The present approach may improve the accuracy of predicting a DR resource's response to a DR signal 14 by applying the following principles: 1) Restrict the DR signal 14 to a set of predefined finite values (e.g., NORMAL, MODERATE, HIGH, and so forth); and 2) For each of the predefined finite values, have the DR resource 12 continuously report back what its load response will be if one of those signal values were to be sent as a DR signal.

The present approach may have the following benefits. 1) Since the DR signal 14 can be of a set of finite values, the DR resource 12 does not necessarily have to support a continuum of values and may more closely match the way in which DR strategies are typically developed. 2) The set of finite values may make it easier for the DR resource 12 to determine what its DR response will be at any given time. 3) Since the DR resource 12 is reporting its response in the same terms as the signal itself, there is no need for the utility/ISO 11 to model the resources' DR strategies or loads.

Figure 3:
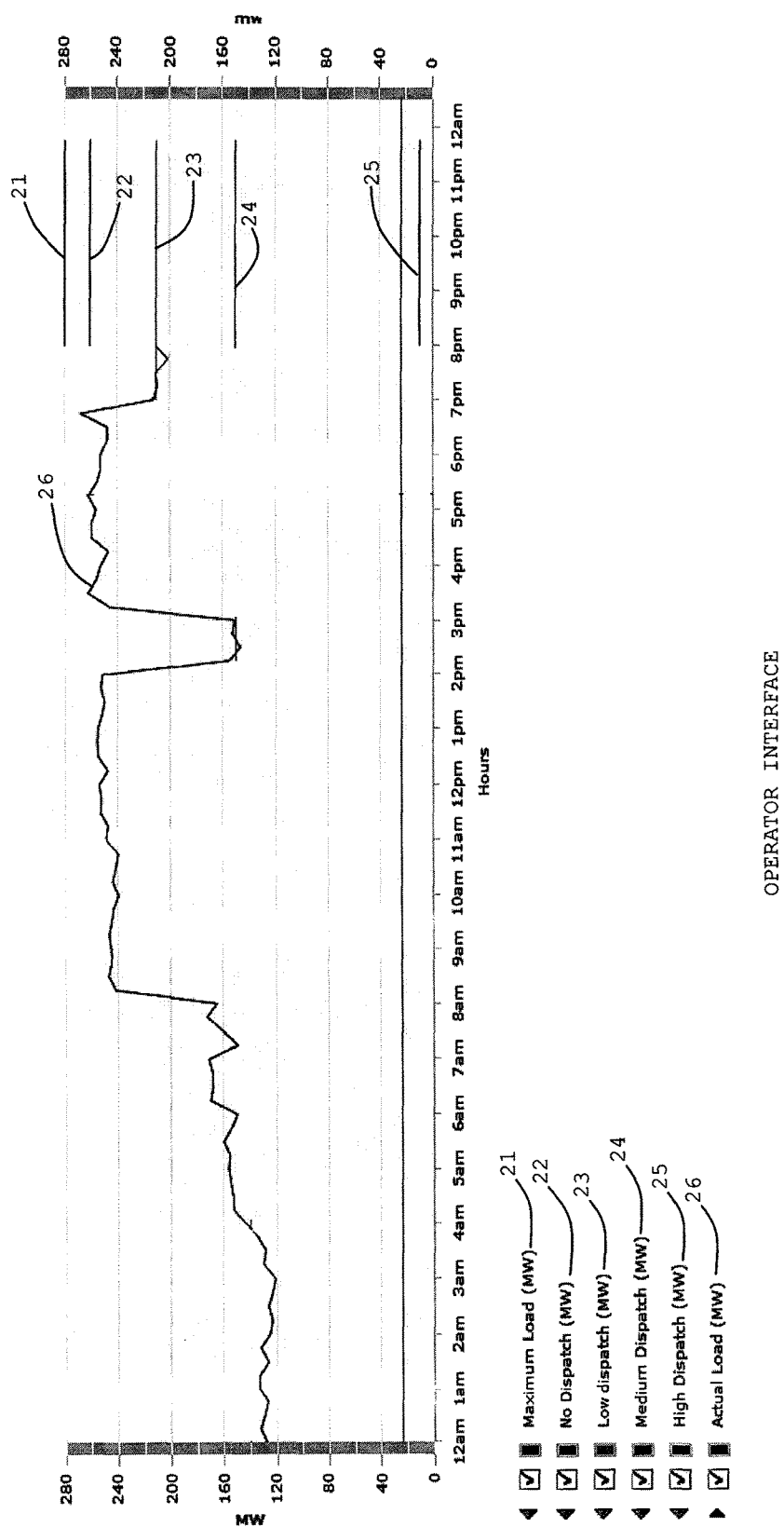
FIG. 3 is a diagram of a graph indicating activity of an operator interface showing a current state of resources and a set of options for various levels for dispatches.

The utility/ISO may use a demand response management system (DRMS) for managing its DR programs. The DRMS may be responsible for presenting the utility/ISO 11 operator with a user interface to manage the DR program and for interacting with the DR resource automation systems to both send DR signals 14 to and receive feedback from DR resource 12. In the case of a fast DR, the operator may have an interface as shown in FIG. 3 that may show the current state of the resources and present the operator with a set of options for what levels they may dispatch the resources to. In the case of FIG. 3, there is only a single DR resource 12 being shown that may respond to DR signals 14 and the finite signal levels are low, moderate, and high.

DR resource 12 may be in constant communications with the DRMS and continuously report what its load response in MW will be if it were to receive any of the predefined signals. On the graph of the operator interface may be depicted the actual load response 26 versus time for DR resource 12 both past and potentially in the future. For times in the future, the different potential load responses may be shown as flat lines 21, 22, 23, 24 and 25 that are based upon feedback received from DR resource 12. In this way, the operator may know precisely what the DR resource's potential load response will be in real time based upon the most accurate source of information, which may be DR resource 12 itself.

Although FIG. 3 only shows a single DR resource, the concept may be extensible to an aggregation of multiple resources. The potential DR resource responses may be aggregated together in the following ways. 1) The response values for each of the signal types may simply be added together and the operator still may have only a small finite number of possible dispatch levels. 2) The various response levels or values may be combined together in such a way that the operator has in essence a more refined number of levels that can be dispatched. With way 1, the number of levels that the operator can use may correspond directly to a number of levels supported by the resources. For example, if all of the resource support was just a MEDIUM or HIGH level, then the operator may only have available to her/him a setting of MEDIUM or HIGH. If the operator chooses MEDIUM, then the same medium signal may be sent to all of the resources and the expected response can be as simple as the MEDIUM level of each resource added together. In way 2, the operator can set the desired amount of shed to send and each resource may be sent a different signal to achieve that level. Resource 1 might get a MEDIUM signal and resource 2 might get a HIGH signal. The point of way 2 is that the combinatorics of all different levels of all the different resources may lend to a much larger number and more refined number of settings that the operator can specify.

When using way 2), with enough DR resources in the aggregate group, the operator may have what would appear to be a continuous number of different dispatch levels that could be chosen including from those that would only dispatch some subset of the available resources. These combinations of resources may be selected in some automated fashion so that the operator would only need to select the level that is desired for dispatch and that the DRMS may select the optimum subset of DR resources 12 to fulfill that objective.

The approach for the DRMS to send DR signals and receive feedback from the resources may use established specifications such as an open ADR.

A comfortable demand response may be noted. DR performed against a home may result in discomfort for a homeowner. Part of a goal may be a recovery rate sufficient to regain a setpoint of a thermostat in the home so as to attain comfort of the home within a reasonable period of time.

Each home may recover to the setpoint differently because of its size, tightness of the construction, size of HVAC equipment, and much more.

A ramp rate score for a home or business may be created. This score may be used to determine the level of demand response that can be performed. For instance, a house #1 may be old and leaky. When a DR event is performed, the temperature of this house may change +5 degrees during the DR event. After the event, the time to reach setpoint may be 2 hours.

In another instance, a house #2 may be a new home and built tightly. When a DR is performed, the temperature of this house may change by +5 degrees during the DR event. After the event, the time to reach setpoint may be 1 hour.

DR events may be set as being customized for the home by understanding the setpoint recovery rate. By performing a test DR event and measuring the recovery to a setpoint, an algorithm may be created and a rating can be placed on a home. The rating may be used to apply a new methodology of DR by the utility. A utility operator may determine that there needs to be a certain amount, e.g., 1 KW, of shed. The operator may select a temperature for an off-set; however, the operator may also set the recovery time for the home.

A utility operator may select plus five (+5) degrees and a recovery to setpoint of one hour (knowing that the homeowners will want a normal planned temperature when they return home). When applying the DR event, homes may be grouped by both temperature and recovery rate.

Home 1 may only have a setback of 2.5 degrees because the recovery takes longer in this home. Home 2 may actually have a setback of 6 degrees because the recovery takes a shorter time in this home.

The homeowners in both instances may be sent a message via text, email or phone or phone app. The message may state the time of the DR event, temperature off-set, and temperature anticipated recovery time.

Utilities may interact with their customers during DR events and send them information (DR signals) during a DR event. A particular type of message may be sent to a customer in a DR event that may incentivize them to participate in a DR event.

An effective resource is especially critical when communities are confronted with a scarcity of a resource in question. It may be noted that "resource" is a term which may have several senses or meanings. "Resource" may refer to energy, commodity, product, load, and so on. In another sense or meaning, "resource" such as a demand response (DR) resource may refer to a customer, user, participant, facility, and so on. In the first mentioned sense, it may refer to electricity, water, gas and natural resources such as oil. A definition of "resource" may be extended to include such things such as water quality and air quality. In this regard, adequate water quality and air quality appear necessary to support a self-sustaining environment.

Resource management, in several senses, may be necessary so that systems can optimize the use of a limited resource. Currently, there are various systems for managing resources in various environments such as buildings, apartments, industrial facilities, and computing systems.

One mechanism that might be used to encourage customers to reduce demand and thereby reduce the peak demand for electricity may be referred to as demand response (DR). Demand response may refer to management of the demand by customers in response to supply conditions. For example, electricity customers may reduce their consumption at critical times and/or costs in response to market prices. These customers may be regarded as DR resources.

DR programs may require that a utility and/or independent system operator (ISO) deliver DR signals to customers or participants via a communications channel. The programs may relate to a distribution of resources such as, but not limited to, electricity, water and natural gas.

DR signals may incorporate business level information, such as prices, reliability and shed levels. At some point, from the utility/ISO to loads in a facility, the business level information sent by the utility/ISO should be processed and used to execute a DR strategy and program for the facility.

DR programs may take many forms. They may differ from normal rates and tariffs in that the DR programs are designed to allow the utility/ISO take specific actions to influence the load profiles of facilities that participate in the DR programs at peak consumption times or periods on a grid. The peak consumption periods may cause critical grid reliability issues which should be addressed, but they may also trigger economic factors where the price of electricity or other power commodity reaches a critical level which may be ameliorated by reducing the overall consumption on the grid during those periods. The critical periods, in which the utility/ISO needs to influence a load profile of a facility, may be referred to as DR events.

A manner in which a utility/ISO may influence a load profile of a facility is to send out a DR signal which is specific to the DR event. DR signals may contain information related to businesses, controlling loads, pricing, and so on. There may be an automated DR where the DR signals that are sent out by the utility/ISO are responded to in an automated fashion. Loads within a facility may ultimately be affected by DR events via DR signals to which the facility acts upon or responds. The term "facility" may refer to virtually any location in which there are loads influenced by DR events. A place where there are such loads may be regarded as a "DR resource". The term "utility" may be used in a general sense to refer to a utility, independent system operator, service provider, and the like.

Figure 4:
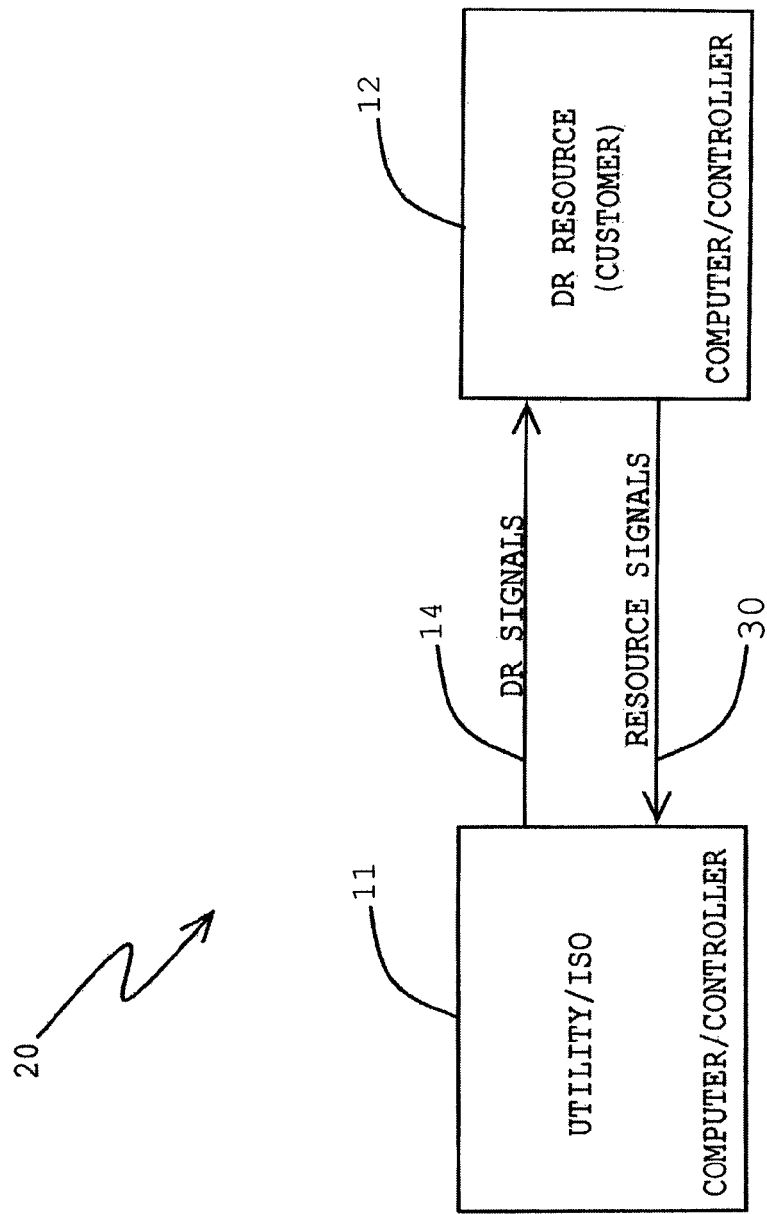
FIG. 4 is a diagram of an implementation of demand response and resource signals in a demand response arrangement of a utility/ISO and a resource.

To provide a context for a mobile communication approach, the present disclosure reveals an implementation of DR signals which may be noted in a demand response arrangement 20 on a diagram of FIG. 4. System 20 and associated software may be obtained and operated with one or more computers/controllers (controllers) 11, 12 and respective connections. The arrangement may be a system that is used by utilities/ISO's to manage the operation of DR programs. A focus of the arrangement may be on the operational aspects of managing the selection, signaling and monitoring of the DR resources that are participating in DR programs. The arrangement may be specifically designed to manage operations of automated DR programs.

There may be various types of interactions that might occur between the utility/ISO and a DR resource as part of a DR program. FIG. 4 is a diagram of an exampled interaction between a utility/ISO 11 and a DR resource (customer) 12. There may be DR signals 14 going from utility/ISO 11 to DR resource 12. There may be DR resource signals 30 incorporating information, such as load measurements, going from DR resource 12 to utility/ISO 11.

Terms such as customer, client, user, participant, DR resource, and like terms, may be used, interchangeably or distinct from one another, depending on a context of a pertinent portion of a description or a claim.

A description of DR signals 14 may be noted. At a high level, there may often be some sort of grid condition, be it economic or grid reliability in nature, which triggers a so-called DR event that requires some sort of interaction between the utility/ISO 11 and its customer 12. This interaction may eventually trigger some sort of load control taking place at a customer's facility. The interaction between the utility/ISO 11 and the customer 12 may be mediated by DR signals 14 and DR resource signals 30, i.e., information such as measurements. Signals 14 and 30 may represent communications between utility/ISO 11, and the DR resource or customer 12. Information contained within DR signals 14 may dictate where much of the decision-making takes place relative to, for example, in how the initial grid condition, which triggered the DR event, results in the eventual load control.

A computer or controller may incorporate one or more inputs, a processor, a user interface incorporating a keyboard, a display and a touch screen, a memory, external connections such as an internet, one or more outputs, and so forth. The computer or controller may be utilized with virtually all items in and pertinent to FIGS. 1-8.

Automated demand response (ADR) programs may be used in a number of different customer market segments ranging from large commercial and industrial to small commercial and residential areas. The number of small commercial facilities may typically outnumber the larger commercial and industrial facilities by an order of magnitude. In addition, the large commercial and industrial facilities may typically have a dedicated staff and a larger budget for installing the equipment necessary to participate in ADR programs.

There may be a use of mobile devices to receive notifications and manage energy based upon location. Utilities may increasingly communicate with their customers to enable them to better manage their energy usage. Communications of these utilities may range from sending their customers energy prices to notifying them of upcoming DR events. In addition to sending their customers information, the utilities may also allow their customers to communicate with them to perform such functions as opting out of DR events or submitting bids as part of a DR program. The increased communications with utilities may create new opportunities for customers to save money by more actively controlling their energy consumption. The approach by which a customer controls its energy consumption may increasingly be done by some sort of automation in the form of a so-called energy management system (EMS). Any system that is capable of controlling customer loads which consume energy may be considered as an EMS. An EMS may be as sophisticated as an industrial control system or as simple as a thermostat. An EMS may be at a facility of a customer.

One approach by which customers and utilities currently communicate may be via the internet and some sort of computer system which requires the customer to be at some fixed location. Here, interactions may be via email or perhaps via some web-based application. Likewise, the way that the customer typically interacts with its EMS may be either directly at the facility with the EMS, or via some computer-based terminal or user interface. None of these interactions may be possible if the user is not at a location that will support the respective interaction.

What is needed is an approach for the customer to interact with the utility or an EMS at a facility in a more convenient fashion that is flexible and can go anywhere that the customer goes. In addition, since the customer is mobile, what is needed may be a way for the customer to receive communications from the utility and to interact with a facility EMS in a fashion that is relevant to its location. A location of the mobile device may affect scenarios or a relevance of knowing something from an item at another location. Examples of where a customer's location is via the mobile device may be relevant in various scenarios relating to utilities and facilities.

A customer with a mobile device may be moving between different facilities in which each facility has its own energy tariff or agreement with potentially different utilities. Examples may include different rates for different regions. A utility may decide to include different facilities in a DR event. A utility may have different agreements, obligations or options with two or more facilities resulting in messages and data from the utility information system being different for various energy management systems of the two or more facilities, respectively. The differences of these items may be noticed by the customer at different locations of the mobile device.

It may be noted that, relative to a facility, sub-systems that the customer may need to interact with may depend upon where the sub-systems are located.

Certain devices, such as cell phones which are becoming more powerful, may become an effective approach for two-way communications and be a prime candidate to allow mobile customers to both communicate with utilities and to interact with their EMS's at various locations.

Mobile devices, such as smart phones, do not necessarily just send and receive messages, but they may provide a way to run fairly sophisticated applications that can be used for remote monitoring and control of energy.

The present approach may use a location of a device as an element to put the communications with the utility and the interactions with a customer's EMS into a context that is most relevant to where the customer is currently located.

Figure 5:
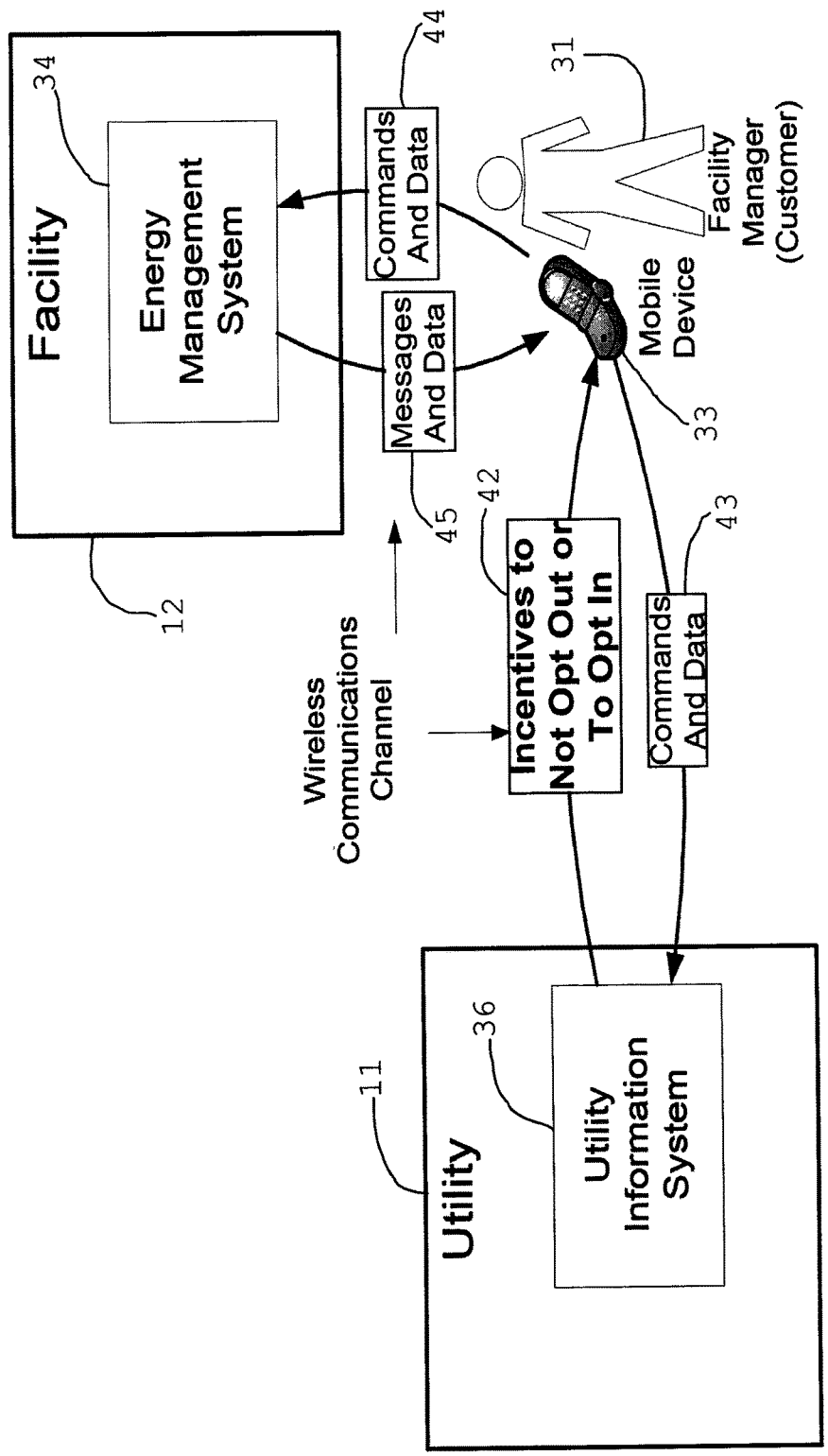
FIG. 5 is a diagram of a demand response arrangement having remote control relative to a utility and a resource incorporating incentives for a resource to not opt out or to opt in a demand response program.

FIG. 5 is a diagram of a use case. The diagram may pertain to energy related interactions. The diagram shows a facility manager (FM) 31 that may be responsible for managing the operations of a facility 12 as it relates to energy consumption. The facility manager 31 may be a person responsible for spending virtually all of his or her time managing a large facility operation, or manager 31 could simply be a small business owner that does nothing more than adjusts its thermostat and lights. FM 31 may be at various locations during the course of the day either on or off site of a facility. FM 31 may carry a mobile device (MD) 33. MD 33 may have the following characteristics. It may be a computing device that is easy to transport around, such as a cell phone, pad, smart phone, tablet or laptop. MD 33 may have a way to communicate wirelessly using technologies such as cellular media or WiFi.

MD 33 may have some sort of user interface that can display data or messages communicated via the wireless communications and receive inputs from the FM 31 that can be transmitted on a wireless communications channel.

MD 33 may have a way to run applications to support the user interface either natively or using some sort of web-based browser technology. MD 33 may have a way to determine the location of the device, either by the device itself or by the system with which the device is communicating.

Facility manager 31 may have a mobile device 33 for communication with an energy management system or sub-system (EMS) 34 of a facility 12 and with a utility information system or sub-system (UIS) 36 of utility 11. Mobile device 33 may be used by facility manager 31 to send commands and data 44 to energy management system 34 and to receive messages and data 45 from energy management system 34. Also, mobile device 33 may be used by facility manager 31 to send commands and data 43 to utility information system 36 and to receive incentives to not opt out or to opt in module 42 from utility information system 36. A conveyance medium for the sending commands and data and receiving messages and data, and incentives to not opt out or to opt in, may be a wireless communications channel.

As shown in FIG. 5, a utility 11 may have an information system 36 that is responsible for interacting with the customer with regards to energy consumption matters. UIS 36 may be selected from a wide range of systems and might include a DR management system (DRMS) or some system that is responsible for sending out dynamic rate information.

When the FM 31 is using MD 33 to interact with utility 11, the information that is displayed to FM 31 may be relevant to where FM 31 is located. Such information may include things such as location specific prices, incentives, requests for bids, DR signals and/or messages.

FM 31 may send commands and data 43 back to utility 11, such as bids or perhaps notifications to opt out or opt in of responses, with or without incentives, to DR events. In addition, FM 31 may interact with different utilities based upon his or her location, especially if FM 31 is managing facilities that are in different regions of the country.

In order for the interactions to be location specific, the information and data from UIS 36 displayed to FM 31 as well as the commands and data, with incentives to not opt out or to opt in, sent from FM 31 should be dependent upon the location of MD 33. This may be accomplished in the following ways. The location of MD 33 may be determined by UIS 36, and UIS 36 may just send information that is relevant to that location. UIS 36 may send out information for virtually all of the possible locations of MD 33, and MD 33 may just present the information that is specific to where it is located at that time.

The approach by which the location of MD 33 is determined may incorporate all of the well known methodologies in use today for such purpose. For example, the approach may incorporate a global positioning system (GPS) within MD 33, cellular tower locations, WiFi access point locations, WiFi signal strengths, Bluetooth access point locations, and other remote location communication mechanisms.

Furthermore, it may be possible for UIS 36 to determine the location of MD 33 based upon one of the above methodologies or it may rely on MD 33 to determine its own location and transmit the location to UIS 36.

FM 31 may interact with EMS 34 of facility 12, and use wireless communications to do so. The messages and data 45 transmitted from EMS 34 to FM 31 may be relevant to the particular loads that FM 31 is controlling, and may allow FM 31 to monitor and control EMS 34 in a fashion that best optimizes use by EMS 34 the information received from UIS 36. Examples may incorporate changing thermostat setpoints based on changing prices from UIS 36.

One may note that FIG. 5 does not necessarily preclude or require a scenario where UIS 36 also communicates with EMS 34 directly as may be the case with certain automated DR programs. In fact, a role of FM 31 in such cases may be to make minor adjustments to the EMS 34 automation that is already programmed into a system.

An approach for influencing demand response event performance through a variable incentive signal may be noted. Automated demand response programs may achieve electrical demand reduction by signaling participating electricity consumers (human and mechanical) to curtail energy usage for a certain period of time, commonly referred to as an "event". Equipment at participating sites may be signaled to change their operating state and use less energy than it would under normal circumstances during the event period. Customers may often be free to "opt-out" and withdraw their participation from DR events, on a per-event basis. When a participant opts out, the total quantity of energy savings of the event may be reduced. If too many participants opt out, then an ability of the demand response program to produce needed results may be severely limited.

A core of the approach is that participating customers may be sent a message offering an incentive to tolerate an ongoing DR event. As an example, at the beginning of a residential demand response event, communication-enabled room thermostats at participating sites may display a notice that a DR event is in-progress and offer a one dollar reward contingent upon the customer leaving the thermostat undisturbed until after a specific time in the future. The customer may be free to opt out anyway, but the customer will not get any reward if the customer does so. As the event progresses, the DR operator may monitor its performance. If the rate of participant opt-outs is greater than desired, room thermostats in the still-participating sites may modify their display to increase the offer to one dollar and fifty cents, two dollars, or ten dollars provided that the human operator continues to cooperate. Through this mechanism, the DR operator may dynamically modulate the rate of opt-outs and therefore the overall productivity of the event. In an urgent event, there is not necessarily any limit to the size of the incentive that can be offered to reduce opt-out performance leakage.

The productivity of a DR event may be addressed by modifying (i.e., adding to or removing from) the pool of participating sites in that event. If too many participants opt out, additional ones may be brought into the event, although they also may very well opt out. The present approach may be different in that instead of modulating the number of participants that are included in the event, it may modulate an incentive signal to keep already-included participants from opting out.

A pattern number one may incorporate an opt-out. First, the demand response operator may schedule a DR event involving a population of participating sites. Second, an electronic signal may be sent to equipment at each participant site, instructing the equipment to enter a state of reduced energy use (e.g., an air conditioning thermostat set to a higher temperature).

Third, a message may be displayed where each affected customer can see the message, informing the customer that a load reduction condition is in effect and informs the customer of the incentive offer to leave the condition undisturbed.

Fourth, some percentage of affected customers may decide that the incentive is not necessarily compelling enough, and choose to opt out of the event. Fifth, the demand response program provider may monitor the rate of opt-out and decide that the rate is too high. Sixth, a message may be displayed where each affected customer can see its changes, informing the customer that the incentive for leaving the equipment undisturbed is now higher.

Seventh, the percentage of affected customers, who reject the incentive and opt out, may decline. Eighth, an overall energy reduction performance of the event may meet the intended goal. Ninth, the end of the event period may be reached. An electronic signal may be sent to all participating equipment releasing the equipment to return to normal operation. Tenth, customers who accepted the offer and remained in the event until its completion should receive their reward.

A pattern number two may incorporate an opt-in. First, the demand response operator may schedule a DR event involving a population of participating sites. Second, a message may be displayed where each affected customer can see it, informing the customer that a load reduction condition in effect and informing the customer of the incentive offer if the customer chooses to participate.

Third, some percentage of invited customers may find the incentive compelling and choose to participate in the event. Fourth, as participants accept the incentive, an electronic signal may be sent to their equipment instructing the equipment to enter a reduced-energy state. Fifth, the demand response program provider may monitor the rate of participation and decide that it is too low.

Sixth, the message may be displayed where each affected customer can see its changes, informing the customer that the incentive for joining the DR event has been increased. Seventh, the percentage of affected customers who accept the incentive and opt in may increase. Eighth, overall energy reduction performance of the event may meet the intended goal.

Ninth, the end of the event period may be reached. An electronic signal may be sent to all participating equipment releasing the equipment to return to normal operation. Tenth, customers who accepted the offer, joined the event, and participated until its completion should receive their reward.

It may be noted that participants who choose to opt out forfeit their incentive. The incentive may only be collected by a participant in choosing to participate until the end of the event period.

A utility/ISO may enroll customers into demand response (DR) programs and model them as so-called DR resources that the utility can call upon when it is necessary for the utility to initiate a DR event. Calling upon a DR resource may typically mean that the utility/ISO sends the DR resource DR signals which affect the DR resource's load consumption in some fashion.

Depending upon the motivating factors for doing DR, a utility/ISO may attempt to affect a DR resource's load profile in a number of different ways such as: 1) Sending price signals to incentivize the DR resource's load consumption behavior; 2) Sending specific dispatch instructions that dictate the amount of load the DR resource should be consuming; and 3) Sending direct load control instructions that put the DR resource's load control in a specific state, i.e., turn a load on or off.

Specific DR programs may typically have a desired mode of interaction specified as part of a program design and the mode may be codified in tariffs that the owner of the DR resource must conform to if the owner enrolls in a DR program. Furthermore, the DR signal that is used in a specific DR program may reflect the desired mode of interaction and thus contain the appropriate information.

For example, a dynamic pricing program (i.e., mode one above) that is designed to cause the customer to shift its load consumption from high peak times to other times of day may send a price in the DR signal. In another example, the DR program may be designed to send dispatch instructions (i.e., mode two) as part of a so called ancillary service to explicitly affect the DR resource's load profile. In this case, the DR signal may contain an explicit load level such as 100 kW.

As noted in the above examples, different DR programs may send DR signals with fundamentally different types of information in the signals. An issue is that this approach may put an undue burden on the systems that must interpret the signals and take the appropriate action, especially if the systems are participating in different DR programs that may have different signals associated with them. Moving a customer from one DR program that uses dynamic pricing signals into a DR program that uses dispatches may require customers to re-program their automation systems to deal with the different DR signals even if their basic load control strategies do not change.

The present system and approach may allow a DR resource 12 owner to specify the DR signals that are sent from the utility/ISO 11 as opposed to the utility/ISO dictating what the signals are. DR resource 12 owners may be allowed to create custom signals that are most appropriate for their systems and operations. This approach may thus help alleviate a need for automated load control systems used by a DR resource needing to interpret different DR signals for different DR programs.

Benefits of the present approach may be the following items: 1) Allow the DR resource to receive and consume a DR signal that is most conducive to the way it operates, thus reducing costs to deploy; 2) Reduce the cost of programming the DR resource's load response by allowing the customers to focus their efforts on programming the load control strategies instead of interpreting and consuming a potentially wide range of different types of DR signals; 3) Allow the DR resources to implement systems with a relatively fixed set of load control strategies that can be used without a change in different DR programs, thus reducing complexity and cost; and 4) Allow the utility/ISO to send different types of signals to different DR resources to facilitate their participation in the DR programs.

Figure 6:
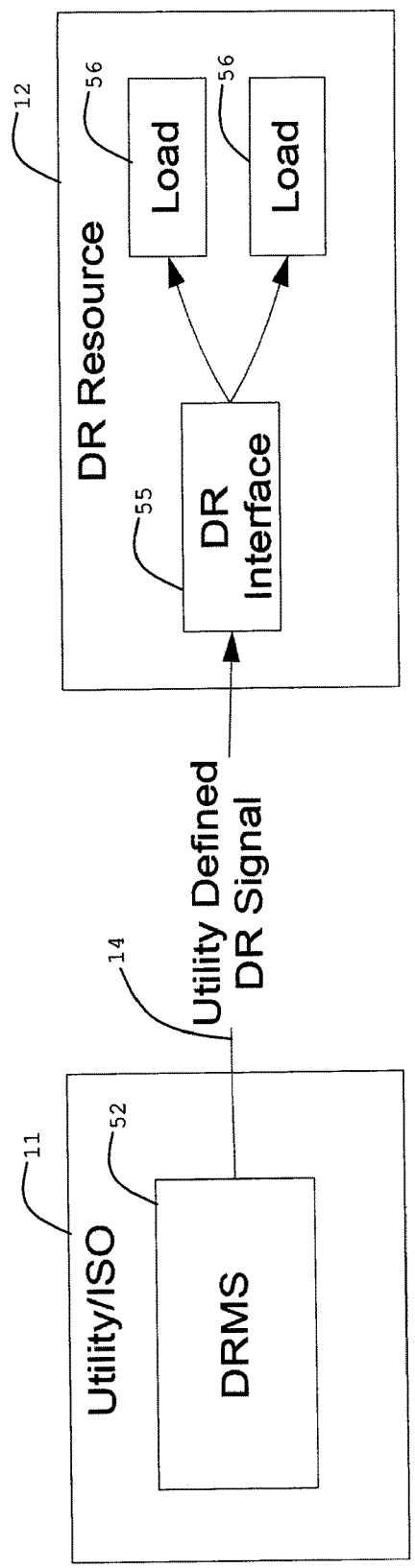
FIG. 6 is a diagram of a utility/ISO that may utilize a demand response management system for providing utility defined signals to a demand response resource.
Figure 7:
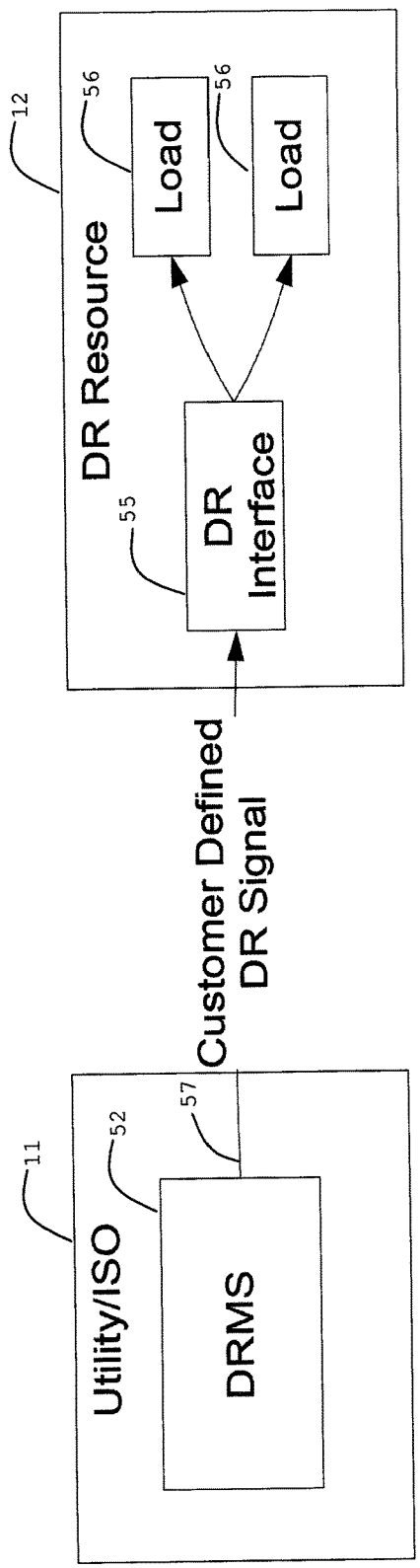
FIG. 7 is a diagram of a utility/ISO that may utilize a demand response management system for providing customer defined signals to a demand response resource.

FIG. 6 is a diagram of a DR scenario in which there is a utility/ISO 11 that may utilize a demand response management system (DRMS) 52 for managing its DR programs to send DR signals 14 to one or more DR resources 12 that are participating in the DR program. DR signal 14 may be defined by utility/ISO 11 on a per program basis.

DR resource 12 may have some sort of DR interface 55 sub-system that consumes DR signals 14 from utility/ISO 11 and in turn forwards messages or commands to a variety of loads 56 within the facility. Loads 56 within the facility may have some sort of controller that can receive messages and control the load consumption. The controller may incorporate a processor and/or computer along with a memory and a user interface. DR interface 55 and loads 56 may be logical entities. DR signal 14 from utility/ISO 11 may be consumed at the load controller itself, thus signifying that the DR interface 55 functionality is embedded within the load controller. The number of loads 56 within the facility can range anywhere from one to many.

The present approach does not depend upon the exact nature of the messages that are sent from the DR interface 55 to loads 56. A point of relevancy is that DR signal 14 may be consumed in such a fashion by DR resource 12 that the information in it can be translated into the appropriate load control actions by DR resource 12. Thus, an emphasis of the present disclosure may be to support the scenario shown in FIG. 7 such that a DR signal 57 that is sent by utility/ISO 11 may have a form and content that is specified by the owner of the DR resource 12 such that it can be consumed and translated into the appropriate load control actions in the most effective fashion as determined by the DR resource 12 owners that must deploy and program the systems that are responsible for doing the load 56 control.

Figure 8:
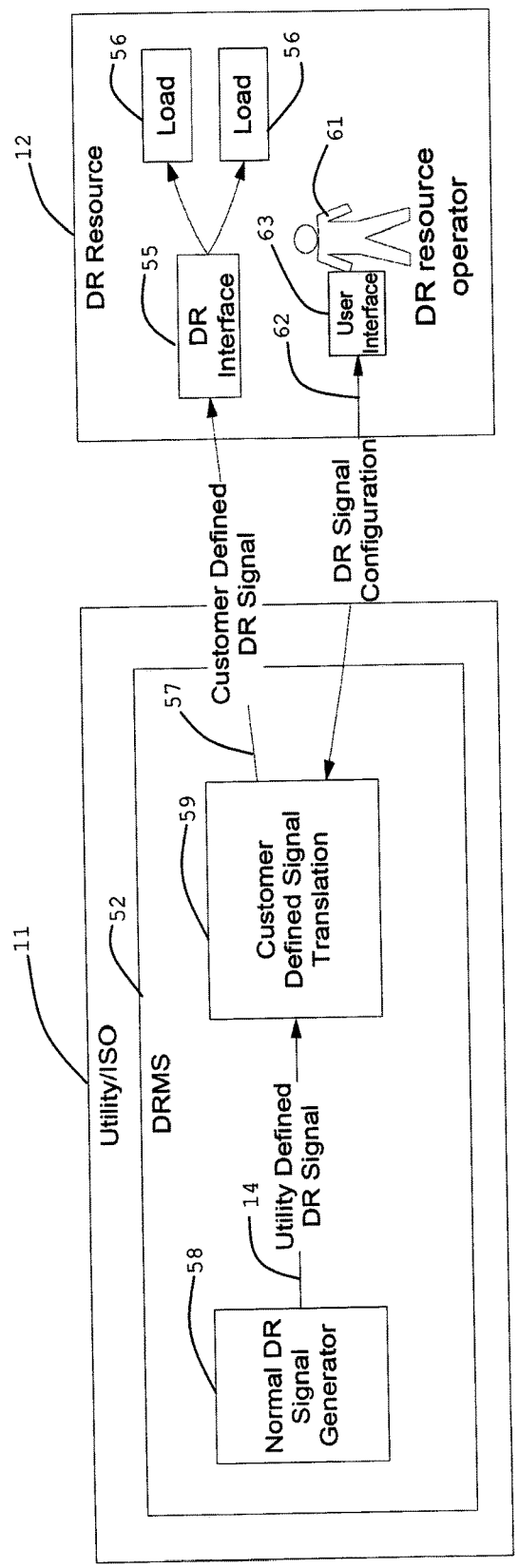
FIG. 8 is a diagram of a utility/ISO that may utilize the demand response management system for translating utility defined signals to customer defined signals for the demand response resource.

FIG. 8 is a diagram showing a DRMS 52 with subsystems that allow customers to specify their own DR signals 57. DRMS 52 may perform virtually all its normal operations and generate a utility defined DR signal 14 as shown by a "normal signal generator" sub-system 58. Signal 14 may be passed through a sub-system referred to as the "customer defined signal translation" sub-system 59. Within sub-system 59 may be a set of user defined rules that are specific to a DR program that will take a DR signal 14 that is specific to that program and translate it into some form of a DR signal 57 as specified by the customer.

As indicated in FIG. 8, there may be DR resource operator 61 that may provides information via, for instance, a user interface 63 and a connection 62, relative a DR signal configuration, that supports the following functions. First, there may be an ability to specify the form and possible values for a customer or user defined signal 57. A signal that is defined by the customer may be designed to make it as easy to consume by DR resource 12 and may be based upon the capabilities of the load 56 control systems within the DR resource 12 facility. These custom DR signals 57 may or may not be dependent upon specific DR programs. Second, there may be a set of DR program specific rules that translate the possible values of the utility specified DR signals 14 into the customer defined set of DR signals 57.

As way of example, one may assume that there is a facility that contains a range of loads such as HVAC, lighting, freezer units, electric vehicles, and so on, and the entire facility may be offered to the utility/ISO 11 as a single DR resource 12. In order to simplify the creation of DR load control strategies, the facility manager may create a set of five different load consumption levels for the entire facility and program the control of the individual loads as they relate to each of the five different levels. For example, perhaps at level one, half the thermostats may be set back one degree and certain lights may be turned off. DR resource operator 61 may then interface to DRMS 52 to create a customer specific DR signal that may contain five levels, one for each of the levels that have been programmed into the control system. Thus, when DR resource 12 receives a DR signal 57 with one of the levels, the proper DR control strategies are already programmed into the system and easy to perform. Operator 61 may need only to specify within DRMS 52 a set of rules. The amount of load consumption levels may be set at virtually any number.

To recap, an energy management arrangement may incorporate a mobile device, a utility information system, and an energy management system. The mobile device may have a wireless connection with the utility information system and the energy management system for communicating incentives to not opt out or to opt in an energy management arrangement, data and commands for managing consumption of energy. The utility information system may be incorporated by a utility. The energy management system may be incorporated by a facility. The facility may consume energy provided by the utility.

The mobile device may be operated by a manager of the facility. The mobile device may receive incentives to not opt out or to opt in an energy management arrangement from the utility information system and the energy management system. The manager may review the incentives to not opt out or to opt in an energy management arrangement. The manager may provide commands and/or data to the energy management system via the mobile device. The manager may provide commands and/or data to the utility information system via the mobile device.

If incentives to not opt out or to opt in an energy management arrangement from the utility to the mobile device indicate demand response information such as a price change for energy due to a demand response event, then the manager may send a command to adjust consumption at the facility from the mobile device to the facility.

The utility information system may send a demand response signal relative to a demand response event to the mobile device. The manager may review the demand response signal and send a command via the mobile device to the facility directing a change of consumption as necessary at the facility in response to the demand response event.

The demand response signal, having information and data, may go to the mobile device. The manager may review the demand response signal at the mobile device. The manager may provide a command signal, as needed, to the facility in response to the demand response signal. The manager, receiving demand response messages and/or data from the energy management system of the facility, may selectively pass the messages and/or data onto the utility.

The utility information system of the utility may send out a demand response signal specific to a demand response event to an energy management system of a facility via the mobile device. Upon receipt of a demand response signal from the utility to the mobile device, the manager may provide commands for adjusting a load of the facility in response to the demand response signal.

A demand response approach may incorporate achieving a reduction of energy demand with an automated demand response program by sending a signal to consumers requesting the consumers to participate in the demand response program by reducing energy usage for a certain period of time of a demand response event. A processor may provide the signal to the consumers. Consumers may opt in for participation in the demand response program. Consumers may opt out from participation in the demand response program. If the consumers in the demand response program provide energy reduction insufficient to meet needed energy savings, then a variable incentive may be sent to encourage consumers to opt in or not to opt out of the demand response program.

If a number of customers that opt out prevent the demand response program from achieving the needed energy savings, then the variable incentive to the consumers may be increased. When the needed energy savings is achieved, then a signal may be sent to the customers indicating that the demand response program is inactive and the variable incentive is zero.

The customers may have communication-enabled thermostats that display whether or not the demand response program is active, and if the program is active, then an amount of incentive may be displayed at the thermostats.

The processor may automatically provide a magnitude to the variable incentive as needed to reduce a number of customers that opt out of the demand response program to assure achieving the needed energy savings.

The customers may automatically opt in for participation in the demand response program even though a need for reduction of energy consumption is absent.

A system for energy management may incorporate a mobile device, a utility, a facility, and a communications channel between the utility and the mobile device and between the facility and the mobile device. The mobile device may be operated by a manager of the facility. The mobile device may receive information for a demand response program of the facility for pursuing energy savings relative to a demand response event, and an incentive to opt out or opt in the demand response program by the facility manager. The mobile device may provide commands and data to the facility and the utility and receives messages and data from the facility.

The system may further incorporate one or more additional facilities having a connection via a communications channel and a mobile device with the utility. When a facility opts out of the demand response program, a quantity of energy savings may decrease. If a number of opt outs by facilities increases and prevents a goal of energy savings being achieved, then the incentives for the facilities to stay or opt in may be increased. The communications channel may be wireless.

A facility manager may receive a message indicating an incentive for participation in the DR program for a complete period of the DR event.

Only when a facility opts in and stays in the demand response program until an end of a period of the DR event, may the facility receive the incentives.

The facility may incorporate a communication-enabled thermostat that displays a notice that a DR event is in progress and offers an incentive contingent on the facility manager leaving the thermostat undisturbed until after a specific time in the future or until the DR event has ended. The thermostat may display an amount of the incentive and a change of the amount of the incentive.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An energy management arrangement comprising:
   a mobile device;
   a utility information system; and
   an energy management system; and
   wherein:
   the mobile device has a wireless connection with the utility information system for communicating incentives to not opt out of or to opt into a reduced energy state of the energy management system and a wireless connection with the energy management system for sending data and commands for managing consumption of energy, wherein the energy management is configured to enter into a reduced energy states during demand response events;
   the utility information system is configured to;
     send incentives to the mobile device to not opt out of or to opt into a reduced energy state for the energy management system during a specific demand response event, wherein the incentives include a specifically stated monetary gain to not opt out of or opt into the specific demand response event, wherein the utility information system is configured to provide the monetary gain prior to a user making any adjustments to the energy management system and the reduced energy state is configured to help the specific demand response event to achieve an overall energy reduction performance goal
     identify that a rate of customers opting out of the reduced energy state is too high or a rate of customers opting into the reduced energy state is too low to reach the overall energy reduction performance goal during the specific demand response event;

in response to the identification, further reduce the reduced energy state for the energy management system so that the overall energy reduction performance goal will be met and send an increased incentive to the mobile device to not opt out of or to opt into the further reduced energy state for the energy management system;

determine an end of the demand response event has been reached;

determine whether an opt out of or a not opt into communication was received from the mobile device during the specific demand response event;

determine that the user of the mobile device forfeited their monetary gain if the communication was received; and send the user of the mobile device their monetary gain if the communication was not received;

the utility information system is incorporated by a utility;

the energy management system is incorporated by a facility; and the facility can consume energy provided by the utility.

2. The arrangement of claim 1, wherein:
the mobile device is operated by a manager of the facility;
the manager reviews the incentives to not opt out or to opt into the reduced energy state;
the manager provides commands and/or data to the energy management system via the mobile device; and
the manager provides commands and/or data directly to the utility information system via the mobile device.

3. The arrangement of claim 2, wherein when incentives to not opt out or to opt into the reduced energy state from the utility to the mobile device indicated demand response information including a price change for energy due to a demand response event, then the manager can send a command to adjust consumption at the facility from the mobile device to the facility.

4. The arrangement of claim 2, wherein:
the utility information system sends a demand response signal relative to the specific demand response event to the mobile device; and
the manager reviews the demand response signal and sends a command via the mobile device to the facility directing a change of consumption as necessary at the facility in response to the demand response event.

5. The arrangement of claim 4, wherein:
the demand response signal, having information and data, goes to the mobile device;
the manager provides a command signal, as needed to the facility in response to the demand response signal.

6. The arrangement of claim 5, wherein the manager receiving demand response messages and/or data from the energy management system of the facility, selectively passes the messages and/or data onto the utility.

7. The arrangement of claim 2, wherein
the utility information system of the utility sends out a demand response signal specific to an ongoing demand response event to an energy management system of a facility via the mobile device; and
upon receipt of a demand response signal from the utility to the mobile device, the manager provides commands for adjusting a load of the facility in response to the demand response signal.

8. A demand response method comprising:
sending a signal from a utility to customers requesting the consumers to not opt out of an ongoing demand response event by maintaining a currently reduced energy usage for a remaining period of time of the ongoing demand response event;

sending a monetary incentive to the customer to not opt out of the ongoing demand response event;

identifying that a rate of customers opting out of the ongoing demand response event is too high to achieve an overall energy reduction performance goal during the ongoing demand response event;

in response to identifying that the rate of customers opting out of the ongoing demand response event is too high, further reducing the currently reduced energy usage for the remaining period of time of the ongoing demand response event so that the overall energy reduction performance goal will be met;

sending an increased monetary incentive to remaining customers that have not opted out of the ongoing demand response event;

determining an end of the ongoing demand response event has been reached;

determining which of the remaining customers did not opt out of the ongoing demand response event;

determining that the remaining customers that did opt out of the ongoing demand response even forfeited the increased monetary incentive; and sending the increased monetary incentive to the remaining customers that did not opt of the ongoing demand response event;

wherein:
a processor provides the signal to the customers;
the customers remain opted in for continued participation in the ongoing demand response event for the remaining period of time of the ongoing demand response event when the customers do not request to opt out of the ongoing demand response event;
the customers opt out from participation in the ongoing demand response event for the remaining period of time of the ongoing demand response event when requested by the customers.

9. The method of claim 8, wherein when a number of the customers that opt out prevent the ongoing demand response event from achieving the overall energy reduction performance goal during the ongoing demand response event, then the variable incentive to the consumers is increased for the remaining period of time of the ongoing demand response event.

10. The method of claim 9, wherein when the overall energy reduction performance goal is achieved, then a signal is sent to the at least some of the customers indicating that the ongoing demand response event is inactive and the variable incentive is zero.

11. The method of claim 8, wherein the customers have communication-enabled thermostats that display whether or not the ongoing demand response event is active, and when the event is active, then an amount of incentive is displayed at the thermostats.

12. The method of claim 9, wherein the processor automatically provides a magnitude to the variable incentive as needed to reduce the rate of the customers that opt out of the ongoing demand response event to assure achieving the overall energy reduction performance goal.

13. The method of claim 8, wherein the customers automatically opt in to participate in the ongoing demand response event even though a need for reduction of energy consumption is absent.

14. A system or energy management comprising:
at least one mobile device;

a utility;
a first facility and at least a second facility; and
a communications channel between the utility and the mobile device and between the first and second facilities and the mobile device; and
wherein:
the mobile device is operated by a manager of the first and/or second facility;
the mobile device receives information for a demand response program of the first and/or second facility to enter a reduced energy state for pursuing energy savings relative to a currently ongoing demand response event that will remain active for a defined period of time;
the mobile device receives one or more incentives from the utility, wherein the incentives are to not opt out of the demand response program by the facility manager, and to remain in the demand response program during the remaining period of time of the ongoing demand response event;
the mobile device provides command and data to the first and/or second facility and the utility and receives messages and data from the first and/or second facility;
the first and/or second facility leaves the reduced energy state and a quantity of energy savings decreases, when the first and/or second facility opts out of the demand response program;
the utility is configured to:
increase the incentives for the first and second facilities to stay or opt in for the remaining period of time of the ongoing demand response event and further reduce the reduced energy state, when a number of facilities opting out of the ongoing demand response event increases and prevents a goal of the energy savings being achieved;
determine an end of the ongoing demand response event has been reached;
determine whether the manager of the first and/or second facility opted out of the demand response program during the ongoing demand response event;
determine that forfeiture of the incentives has occurred if it is determined that the manager of the first and/or second facility opted out of the demand response program during the ongoing demand response event; and
send the incentive to the manager if it is determined that the manager of the first and/or second facility did not opt out of the demand response program during the ongoing demand response event.

15. The system of claim 14, wherein a facility manager receives a message indicating an incentive for participating in the DR program for a complete period of the DR event.

16. The system of claim 14, wherein only when a facility opts in and stays in the demand response program until an end of a period of the DR event, does the facility receive the incentives.

17. The system of claim 16 wherein the facility comprises a communication-enabled thermostat that displays a notice that a DR event is in progress and offers an incentive contingent on the facility manager leaving the thermostat undisturbed until after a specific time in the future or until the DR event has ended.

18. The system of claim 17, wherein the thermostat may display an amount of the incentive and a change of the amount of the incentive.

19. The system of claim 14, wherein the communications channel is wireless.

* * * * *